Patented Apr. 9, 1946

2,398,253

UNITED STATES PATENT OFFICE 2,398,253

SULPHIDES OF ALKYLATED PHENOLS

Dilworth T. Rogers, Teaneck, and Herman Feldhusen, Jr., North Plainfield, N. J., assignors to Standard Oil Development Company, a corporation of Delaware No Drawing. Application June 20, 1944,
Serial No. 541,299

16 Claims. (Cl. 260—137)

This invention relates to the manufacture of sulphides of alkylated hydroxy aromatic compounds and especially the sulphides of alkylated phenols.

The sulphides of alkylated phenols and the like, and likewise their metal salts, have been found to be particularly useful as lubricating oil additives. The alkyl phenol sulphides are generally prepared on a commercial scale by alkylating a phenol with an olefin in the presence of a catalyst and then further reacting the alkylated phenol, generally in the presence of a solvent, with a halide or oxyhalide of sulphur, such as sulphur monochloride, sulphur dichloride, thionyl chloride or sulphuryl chloride. As an example of this process, a tert.-octyl phenol is prepared by reacting diisobutylene with a phenol, and the product is reacted with sulphur dichloride to produce chiefly the monosulphide of tert.-octyl phenol. A serious practical problem involved in this process is the presence of the alkylation catalyst in the alkylated phenol after the alkylation reaction has been completed. Some Friedel-Crafts type catalysts, for example, if allowed to remain in the alkylated phenol product during the treatment with a sulphur chloride, frequently promote chlorination of the product in addition to sulphurization.

Because of the adverse effects produced by the presence of such catalysts it is necessary to remove them from the alkylated phenols before sulphurization. Discovery of an alkylation catalyst which will not interfere in the sulphurization step would be advantageous since it would greatly simplify manufacturing operations by eliminating the step of removing the catalyst. It has been found that stannic chloride is such a catalyst but that it is of only limited ability, that is, its use must be confined to sulphurization reactions conducted in chlorinated solvents such as chloroform, ethylene dichloride or carbon tetrachloride. When employing petroleum hydrocarbon solvents, which are economically much more preferable, it was found that a large amount of tarry sludge was produced when the alkylated phenols (containing stannic chloride catalyst) were sulphurized with sulphur halides. This sludge is particularly objectionable in the commercial manufacture of alkyl phenol sulphides because it tends to clog the outlet valves of the reaction vessels and is difficult to remove. Frequent cleaning of reaction vessels is thus necessary which consequently impairs production efficiency.

It has now been found that the halides of boron constitute a class of catalysts which will efficiently promote the alkylation of phenols and will at the same time permit the use of hydrocarbon solvents in the sulphurization step without the formation of objectionable sludge, even though the alkylation catalyst is not removed from the alkylated phenol. It has been discovered that the halides of boron and complexes containing these compounds are not only efficient alkylation catalysts, but also act as catalysts to a certain degree in the sulphurization step, and, depending on reaction conditions, either produce no sludge at all in the presence of a hydrocarbon solvent or produce only a granular powder which does not adhere to the walls of the reaction vessel and therefore does not interfere with the handling of the phenol sulphide solutions. The boron halides, particularly boron trifluoride, have been found to be particularly useful in the reaction of the alkylated phenols with sulphur halide. Without a catalyst, this reaction is usually preceded by an incubation period and then begins with violence, causing difficulties in operation. The presence of the boron halide catalyst causes the reaction to begin promptly and to proceed smoothly throughout its course. It is thus not only unnecessary to remove this catalyst, but it is highly desirable to retain the same in the alkylated phenol product because of its assistance in the sulphurization step.

Furthermore, the presence of the boron halide also promotes the formation of alkylated phenol sulphides of more desirable properties. In the reaction of alkyl phenols with sulphur halides it is generally the case that a mixture of compounds is formed rather than one particular chemical compound, that is, in addition to the alkyl phenol sulphide itself polymeric materials are also usually present. This is normally desirable when the products are to be employed as lubricating oil additives since the pure crystalline alkyl phenol sulphides are not as oil-soluble as the polymeric type mixtures. To promote the formation of the latter type of material it is therefore usually more desirable to employ more than the theoretical 1:2 mole ratio of sulphur halide to phenol. Nevertheless, in spite of this some pure crystalline alkyl phenol sulphide does form under normal circumstances. It has now been found that when sulphurization is conducted in the presence of boron fluoride catalyst the formation of crystalline material is almost completely eliminated, thus giving a higher yield of usable product.

As stated above, under certain conditions the boron halide catalyst does not produce any sludge or precipitate when sulphurizing alkylated phenols in hydrocarbon media. This favorable condition is usually secured by first adding the boron halide catalyst to the phenol and then introducing the olefin in the alkylation stage. This method of conducting the process insures a minimum amount of free phenol in the alkylation product, and with a substantially pure alkylated phenol little or no sludge formation or precipitation takes place.

The present invention applies not only to the alkylation of the phenol itself, but to the alkylation of other monohydroxy aromatic compounds, particularly the alkylated phenols, naphthols and other monohydroxy aromatic hydrocarbons. The invention applies likewise to the alkylation of compounds of the class described which contain substituted atoms or groups which do not interfere with the alkylation reaction, such as ether, ester, keto, aldehyde, other alkyl groups, and the like. The invention is also applicable to the alkylation of aromatic esters, ketones, ethers, etc., per se, that is regardless of whether they also contain phenolic hydroxyl groups.

Included also are the high molecular weight alkylated phenols which may be prepared by condensing phenols with chlorinated petrolatum or chlorinated paraffin wax or with a chlorinated kerosene or gas oil. Naturally occurring phenols such as those obtained by alkaline extraction of certain petroleum stocks or those obtained from cashew nut shell liquid or those obtained from other vegetable oil sources may likewise be used.

Any of the olefins may be used for alkylation, such as the individual olefins or olefin-containing mixtures derived from petroleum sources, such as refinery gases containing propylene, butylenes, amylenes, etc., also olefin polymers such as diisobutylene, triisobutylene or n-butene polymers obtained as by-products in the manufacture of butyl alcohol from petroleum refinery butenes.

The catalysts preferred for use in accordance with the present invention are the boron halides, especially boron trifluoride and complexes containing the same, such as the combinations of boron trifluoride with water and with phosphoric acid, although only very limited amounts of water may be tolerated in the sulphurization reaction. Hydrogen fluoride may similarly be used.

As has been stated above, the preferred method of carrying out the alkylation reaction consists in first adding the catalyst to the phenol and subsequently adding the olefin. This procedure results in a much more complete conversion of the phenol to alkylated phenol than when the catalyst is added to a mixture of the olefin and phenol. This may be shown clearly in the following data, obtained in a process of reacting equal molecular proportions of diisobutylene and phenol at 180° C., using in each case 0.5% of boron trifluoride based on the total reactants, and conducting the reaction for 60 minutes:

Table I

| Catalyst | Reaction method | Per cent unchanged phenol |
|---|---|---|
| 0.5% BF₃ | Catalyst added last | 6.9 |
| 0.5% BF₃ | Olefin added last | 1.1 |

Of special interest is the application of the present invention to the production of the sulphide of tert.-octyl phenol by the reaction of diisobutylene with phenol and the subsequent reaction with sulphur dichloride. The conditions best suited for conducting this process have been investigated in considerable detail, particularly with regard to the conditions required to produce an alkylated phenol containing a minimum amount of unchanged phenol. Separate studies have been made of the effect of reaction time, reaction temperature and catalyst concentration. In all these studies a 1:1 mol ratio of olefin to phenol was employed. It should be understood, however, that other ratios may also be employed in practicing the invention. In general, if excess olefin is employed a lower melting point crude alkylated phenol product is obtained, but at the same time the product contains less non-alkylated phenol. If excess phenol is employed over the 1:1 ratio, dialkylation, i. e., formation of dialkyl phenol in addition to the monoalkylated products, is minimized.

In a study directed to the determination of the best reaction time, the alkylation reactions were carried out with 0.5% boron fluoride, based on the total reactants present, the catalyst being first added to the phenol and the reactions being conducted at 50°–90° C. The results are as follows:

Table II

| Time for olefin addition, min. | Percent unchanged phenol in crude product |
|---|---|
| ¹ 13 | 0.8 |
| 90 | 4.7 |
| 150 | 4.4 |

¹ Stirred 10 minutes after olefin addition.

Other studies have shown that when the reaction is allowed to proceed at 90° C. for 15–60 minutes after the olefin addition there is breakdown in the product, indicated by a lower melting point. This effect, apparently due to dealkylation and/or rearrangement of the tert.-octyl phenol into dialkyl phenols, appears to be associated with long periods of contact with the alkylation catalyst at elevated temperatures. This is shown in the following table of data obtained with reactions conducted as described above:

Table III

| Time for olefin addition, min. | Additional reaction time, min. | Reaction temp., °C. | Melting point of product, °C.¹ |
|---|---|---|---|
| 150 | 0 | 50–90 | 61–73 |
| 150 | 15 | 90 | (²) |
| 13 | 10 | 80 | 65–81 |
| 13 | 60 | 80 | 56–78 |

¹ Melting point of pure tert.-octyl phenol = 86° C.
² Partly liquid at room temp.

This breakdown of the product was also noted in an experiment in which pure tert.-octyl phenol was heated for 1 hour at 90° C. with 1% boron fluoride. Under these conditions a liquid product containing 3% free phenol was obtained.

It may thus be observed that the rate of olefin addition must be fairly rapid and yet not too much so; too slow a rate of addition causes isomerization of the alkylated phenol and too rapid a rate causes polymerization of the olefin before it has had an opportunity to enter into the alkylation reaction. Furthermore, the reaction must not be allowed to continue for any great length of time after the olefin has been added, since this will also cause isomerization of the alkylated phenol. The reaction can most conveniently be stopped by adding a solvent to the reaction mixture to cool it rapidly. A suitable solvent would be one that can be employed in the next step, i. e., sulphurization of the alkyl phenol with a sulphur halide.

The effect of reaction temperature in the alkylation reaction to produce tert.-octyl phenol, using boron trifluoride as a catalyst, was studied in the temperature range of 70°–90° C. When operating with 0.5% boron trifluoride, based on the total reactants, and adding the olefin over a period of 90 minutes, with an additional 30 minutes stirring time, the melting range of the tert.-octyl phenol was found to be approximately the same when prepared at either 70° C. or 90° C., although the lower temperature favors a lower percentage of unreacted phenol in the product. The reactions were conducted, as before, with equal molecular proportions of diisobutylene and phenol. The results are shown in the following table:

*Table IV*

| Temp. during olefin addition, °C. | Temp. during additional stirring, °C. | Time of additional stirring, min. | Crude reaction product | |
|---|---|---|---|---|
| | | | Percent unreacted phenol | Melting range, °C. |
| 50-70 | 70 | 30 | 0.4-1.4 | 72-81 to 75-76. |
| 50-90 | 90 | 30 | 2.7 | 74-76. |

The effect of catalyst concentration in this reaction was also studied. Results obtained in alkylations conducted at 90° C. with an olefin addition time of 90 minutes indicated that an increase in boron fluoride concentration has an adverse effect on the quality of the product, as judged by the melting point. Below are given data obtained by conducting the reactions at a temperature of 50°–90° C. during the olefin addition and maintaining a temperature of 90° C. during additional stirring, equal molecular proportions of olefin and phenol being used.

*Table V*

| Catalyst concentration (weight percent)[1] | Time of additional stirring, min. | Percent unreacted phenol | Melting range, °C |
|---|---|---|---|
| 0.5 | 0 | 4.7 | 64-81. |
| 0.5 | 30 | 2.7 | 74-75. |
| 1.0 | 0 | 4.0 | Partly liquid at 25° C. |
| 1.0 | 30 | 3.8 | Completely liquid at 25° C. |

[1] Based on total reactants.

In summary, the optimum conditions for the production of the best possible grade of tert.-octyl phenol are the following: (1) addition of the boron fluoride to the phenol before the addition of the olefin; (2) addition of the olefin rapidly, preferably in 15 minutes or less; (3) conducting the reaction for only a short period (10 minutes or less) after the olefin has been added; (4) a reaction temperature not exceeding 70° C.; and (5) a catalyst concentration not greater than 0.5%, based on the total reactants.

For the subsequent sulphurization of the tert.-octyl phenol prepared as described above, using sulfur dichloride as the reagent for producing chiefly the monosulphide product, the tert.-octyl phenol, containing the boron halide catalyst, may be dissolved in a suitable solvent, preferably a hydrocarbon solvent, as for example, a petroleum naphtha boiling in the range of 190°–265° F. or an aromatic type solvent boiling at 200°–280° F. and containing 65–70% of aromatic hydrocarbons obtained in the cracking and dehydrogenation of petroleum oils. These have been found to be particularly suited for the production of a tert.-octyl phenol sulphide which is to be converted to a metallic salt and employed as an additive for lubricating oils. Another suitable solvent is benzol. In some cases it may be desirable to select an aromatic solvent mixture containing high percentages of xylenes, some of which may be expected to enter into the sulphurization reaction, giving modified phenol sulphide products of enhanced properties. A sufficient amount of solvent should be used to prepare a solution containing up to 60% of tert.-octyl phenol, (usually 40–60%), and the reaction temperature may be of the order of 0–100° C. and is preferably from 20 to 40° C.

In general, the best results are obtained if the sulphurization is carried out rapidly and if efficient agitation is employed. The mole ratio of sulphur halide to alkyl phenol may be in the range of 1:2 to 2:2 and for most purposes is preferably from 1.3:2 to 1.6:2 when the products are to be used as such as lubricating oil additives or if they are to be esterified or converted to metal salts and employed as lubricating oil additives in such modified form.

The invention is not to be considered as limited by any of the examples described above, which have been presented for illustrative purposes only, but solely by the terms of the appended claims.

We claim:

1. The process of preparing a sulphide of an alkylated monohydroxy aromatic compound which comprises alkylating a monohydroxy aromatic compound with an olefin in the presence of a boron halide-containing catalyst, dissolving the reaction product containing said catalyst in a solvent, and treating the solution thus formed with a sulphur halide.

2. The process of preparing a sulphide of an alkylated monohydroxy aromatic hydrocarbon which comprises alkylating a monohydroxy aromatic hydrocarbon with an olefin in the presence of a boron halide-containing catalyst, dissolving the reaction product containing said catalyst in a solvent, and treating the solution thus formed with a sulphur halide.

3. The process of preparing a sulphide of an alkylated phenol which comprises alkylating a phenol with an olefin in the presence of a boron halide-containing catalyst, dissolving the reaction product containing said catalyst in a solvent, and treating the solution thus formed with a sulphur halide.

4. A process according to claim 3 in which the solvent is a hydrocarbon solvent.

5. The process of preparing a sulphide of an alkylated phenol which comprises adding boron trifluoride in catalytic proportions to a phenol, thereafter alkylating the phenol with an olefin, dissolving the product of the alkylation reaction, containing the said catalyst, in a solvent, and treating the solution thus formed with a sulphur chloride.

6. The process of preparing a sulphide of tert.-octyl phenol which comprises adding boron trifluoride in catalytic proportions to phenol, thereafter alkylating the phenol with diisobutylene, dissolving the product of the alkylation, containing the boron trifluoride, in a hydrocarbon solvent, and treating the solution thus formed with sulphur dichloride.

7. A process according to claim 6 in which the phenol and diisobutylene are reacted in substantially equal molecular proportions.

8. A process according to claim 6 in which the boron trifluoride is present in an amount not greater than about 0.5%, based on the total reactants present.

9. A process according to claim 6 in which the temperature of the alkylation reaction is not greater than about 70° C.

10. A process according to claim 6 in which the diisobutylene is added to the phenol during a period not greater than about 15 minutes and in which the reaction is not allowed to continue for more than about 10 minutes after the diisobutylene has been added.

11. The process of preparing a sulphide of tert.-octyl phenol which comprises adding a boron trifluoride catalyst to phenol, thereafter treating the mixture thus formed with diisobutylene in an amount which is substantially equal in molecular proportion to the phenol present at a temperature not greater than about 70° C., the amount of boron trifluoride used being not greater than about 0.5%, based on the total weight of the phenol and diisobutylene present, adding the diisobutylene to the phenol during a period not greater than about 15 minutes and permitting the reaction to continue for a period not greater than about 10 minutes after addition of the diisobutylene, dissolving the product of the alkylation, containing the boron fluoride, in a hydrocarbon solvent in a concentration equal to about 40 to 60%, and treating the solution thus formed with sulphur dichloride at a temperature of about 20 to about 40° C.

12. A process according to claim 11 in which the hydrocarbon solvent is a naphtha of about 190°–265° F. boiling range.

13. A process of preparing tert.-octyl phenol which comprises adding a boron trifluoride catalyst to phenol, thereafter treating the mixture thus formed with an amount of diisobutylene which is substantially equal in molecular proportion to the phenol present at a temperature not greater than about 70° C., the amount of boron trifluoride used being not greater than about 0.5%, based on the total weight of the phenol and diisobutylene present, adding the diisobutylene over a period not greater than about 15 minutes and continuing the reaction for a period not greater than about 10 minutes after such addition of diisobutylene.

14. The process of preparing an alkyl phenol sulphide comprising the reaction of an alkyl phenol with a sulphur halide in the presence of a boron halide catalyst.

15. The process of preparing tert.-octyl phenol sulphide comprising the reaction of tert.-octyl phenol with sulphur dichloride in the presence of a small amount of boron trifluoride.

16. A process according to claim 15 in which the reaction is conducted in a hydrocarbon solvent.

DILWORTH T. ROGERS.
HERMAN FELDHUSEN, Jr.